United States Patent [19]

Sakigawa et al.

[11] Patent Number: 5,069,037

[45] Date of Patent: Dec. 3, 1991

[54] FLUID SUPPLY SYSTEM FOR VEHICLES

[75] Inventors: Shigenori Sakigawa, Itami; Ryota Ohashi, Sakai; Jiro Shibata; Masahisa Kawamura, both of Amagasaki, all of Japan

[73] Assignee: Kanzaki Kokyukoki Mfg. Co., Ltd., Amagasaki, Japan

[21] Appl. No.: 613,082

[22] Filed: Nov. 14, 1990

[30] Foreign Application Priority Data

Dec. 5, 1989 [JP] Japan ................ 1-140893[U]

[51] Int. Cl.⁵ .................................. F16D 31/02
[52] U.S. Cl. ........................... 60/435; 60/464; 60/475; 60/494; 60/486; 60/484; 60/488; 60/426
[58] Field of Search ................ 60/426, 427, 464, 486, 60/487, 435, 488, 484, 471, 494, 475; 417/302, 307

[56] References Cited

U.S. PATENT DOCUMENTS

| | | | |
|---|---|---|---|
| 3,908,377 | 9/1975 | Riedhammer | 60/494 X |
| 3,952,511 | 4/1976 | Turner et al. | 60/464 X |
| 4,015,482 | 4/1977 | Ito et al. | 60/435 X |
| 4,495,767 | 1/1985 | Akiyama et al. | 60/435 X |
| 4,543,786 | 10/1985 | Shuler | 60/435 |
| 4,621,495 | 11/1986 | Hedlund | 60/494 X |
| 4,731,998 | 3/1988 | Maesaka et al. | 60/435 |
| 4,962,644 | 10/1990 | Polacek | 60/435 |
| 4,986,071 | 1/1991 | Voss et al. | 60/427 X |

FOREIGN PATENT DOCUMENTS

| | | |
|---|---|---|
| 49-29191 | 8/1974 | Japan . |
| 55-8229 | 2/1980 | Japan . |
| 56-37703 | 2/1981 | Japan . |
| 61-30703 | 4/1986 | Japan . |
| 62-12118 | 7/1987 | Japan . |

*Primary Examiner*—Edward K. Look
*Assistant Examiner*—Todd Mattingly

[57] ABSTRACT

A single hydraulic pump (6) is employed in a vehicle for supplementing fluid to a hydrostatic transmission (1) and for supplying fluid to a fluid-operated clutch (2) and to high pressure-actuated hydraulic actuators (3, 4, 5). Fluid discharge path (7) of the pump is connected to the hydrostatic transmission through a pressure-reducing valve (8). Fluid drain path (9) of the reducing valve is fashioned to a fluid supply path for the clutch. A second fluid supply path (11) is connected to the discharge path for supplying fluid to the hydraulic actuators and include a relief valve (12) or orifice (12A) for maintaining fluid pressure in the discharge path higher than the output pressure of the reducing valve. A high pressure relief valve (10) for establishing fluid pressure to be applied to the actuators is connected to the discharge path for minimizing a discharge pressure required to the pump.

3 Claims, 4 Drawing Sheets

FLUID SUPPLY SYSTEM FOR VEHICLES

FIELD OF THE INVENTION

This invention relates to a fluid supply system for vehicles used for various working purposes. More particularly, the present invention relates to a fluid supply system for use in a vehicle of a type having a hydrostatic transmission which is operable to vary travelling speed of the vehicle in a non-stepwise manner, a fluid-operated clutch disposed in a transmission path, and at least one hydraulic actuator, such as a power cylinder for steering the vehicle or lift cylinder for lifting an auxiliary implement, which is actuated by high pressure fluid.

BACKGROUND OF THE INVENTION

A fluid supply system for use in a vehicle of the type set forth above is disclosed in, for example, JP, U No.61-30703. In the system disclosed in this prior art literature, discharge flow of a single hydraulic pump is divided into two flows one of which is used for actuating hydraulic cylinders, associated to auxiliary implements and requiring a high actuating fluid pressure, and the other of which is used for a power steering cylinder requiring also a high actuating fluid pressure. Although fluid drained from the power steering mechanism is used for operating a fluid-operated clutch disposed in a transmission path, a charge pump for supplementing fluid to a hydrostatic transmission is provided separately.

There is known from, for example, JP, Y2 No.49-29191; JP, U No.55-8229; and JP, Y2 No.62-12118, a prior art system in which a hydraulic pump for supplementing fluid to a hydrostatic transmission is also used for supplying fluid to various hydraulic actuators. In each of the fluid supply systems disclosed in these prior art literatures, a hydraulic actuator is arranged at a location nearer to a hydraulic pump than a hydrostatic transmission and a directional control valve for the actuator is fashioned to include a neutral position where an inlet port of the valve is communicated with a drain port of the valve. A fluid supplement path for the hydrostatic transmission is connected to the drain port of the directional control valve so that fluid flowing from the pump into the valve is delivered, at the neutral position of the valve, to the fluid supplement path, whereas fluid drained from the hydraulic actuator is delivered, at an operative position of the control valve, to the fluid supplement path.

Each of the fluid supply systems disclosed in JP, U No.55-8229 and Jp, Y2 No.62-12118 is further fashioned such that fluid relieved from a relief valve for establishing a fluid pressure to be applied to the hydraulic actuator is also delivered to the fluid supplement path set forth above. Furthermore, in the system disclosed in JP, Y2 No.62-12118, another directional control valve for another hydraulic actuator (lift cylinder) is incorporated in a fluid path between the pump and directional control valve for the former actuator. Because a lift cylinder requires a high fluid pressure for its lifting operation, the another directional control valve is fashioned such that, at its operative position where the lift cylinder is supplied with fluid for a lifting operation, no fluid is flowed out to a downstream side of this valve.

Of these prior art systems, the fluid supply system disclosed in JP, Y2 No.49-29191 in which only fluid drained from a hydraulic actuator is delivered, at an operative position of a directional control valve for the actuator, to a fluid supplement path for the hydrostatic transmission involves a problem that no fluid is supplied to the fluid supplement path during a period from the time, when the hydraulic actuator has reached its stroke end, to the time when the directional control valve has been returned to its neutral position.

Contrary to this, in each of the fluid supply systems disclosed in JP, U 55-8229 and JP, Y2 No.62-12118 in which fluid drained from a hydraulic actuator is also delivered, at an operative position of a directional control valve for the actuator, to a fluid supplement path for the hydrostatic transmission, the relief valve performs its fluid-relieving operation, after the hydraulic actuator has reached its stroke end, so that fluid is still supplied to the fluid supplement path.

On the other hand, this structure heightens the cost of a hydraulic pump to be employed. This is because a minimum discharge pressure required to such pump is the sum of the relief pressure of the relief valve for establishing fluid pressure to be applied to the hydraulic actuator and the relief pressure of another relief valve to be connected to the fluid supplement path for establishing fluid pressure of fluid, which is supplemented to the hydrostatic transmission, so that a hydraulic pump having a high discharge pressure is required.

The structure disclosed in JP, Y2 No.49-29191, in which supplement of fluid to the hydrostatic transmission is interrupted, and the structure disclosed in JP, Y2 No.62-12118, in which supplement of fluid to the hydrostatic transmission is also interrupted when the lift cylinder is operated, are never preferred in view of a fact that a hydrostatic transmission may easily be damaged due to a lack of operating fluid in it.

The structure disclosed in each of JP, U No.55-8229 and JP, Y2 No.62-12118 which requires an expensive pump having a high discharge pressure is never preferred, too. If a fluid-operated clutch disposed in a transmission path is to be supplied with its operating fluid also by such pump, a hydraulic pump having a larger discharge pressure is to be employed. This is never preferred, although a fluid-operated clutch requires for its operation only a relatively low fluid pressure.

Object

Accordingly, a primary object of the present invention is to provide an improved fluid supply system for supplementing fluid to a hydrostatic transmission and for supplying fluid respectively to a fluid-operated clutch and to at least one hydraulic actuator requiring a high actuating pressure, in which supplement of fluid to the hydrostatic transmission is not interrupted, in which a single hydraulic pump is employed in a fashion such that the pump may have a minimum discharge pressure limited only by a fluid pressure to be applied to the hydraulic actuator, and in which a directional control valve for the fluid-operated clutch may be reduced in size.

BRIEF DESCRIPTION OF THE DRAWINGS

Other objects and advantages of the invention will become readily apparent as the specification is considered in conjunction with the accompanying drawings in which.

SUMMARY OF THE INVENTION

Figure 1:
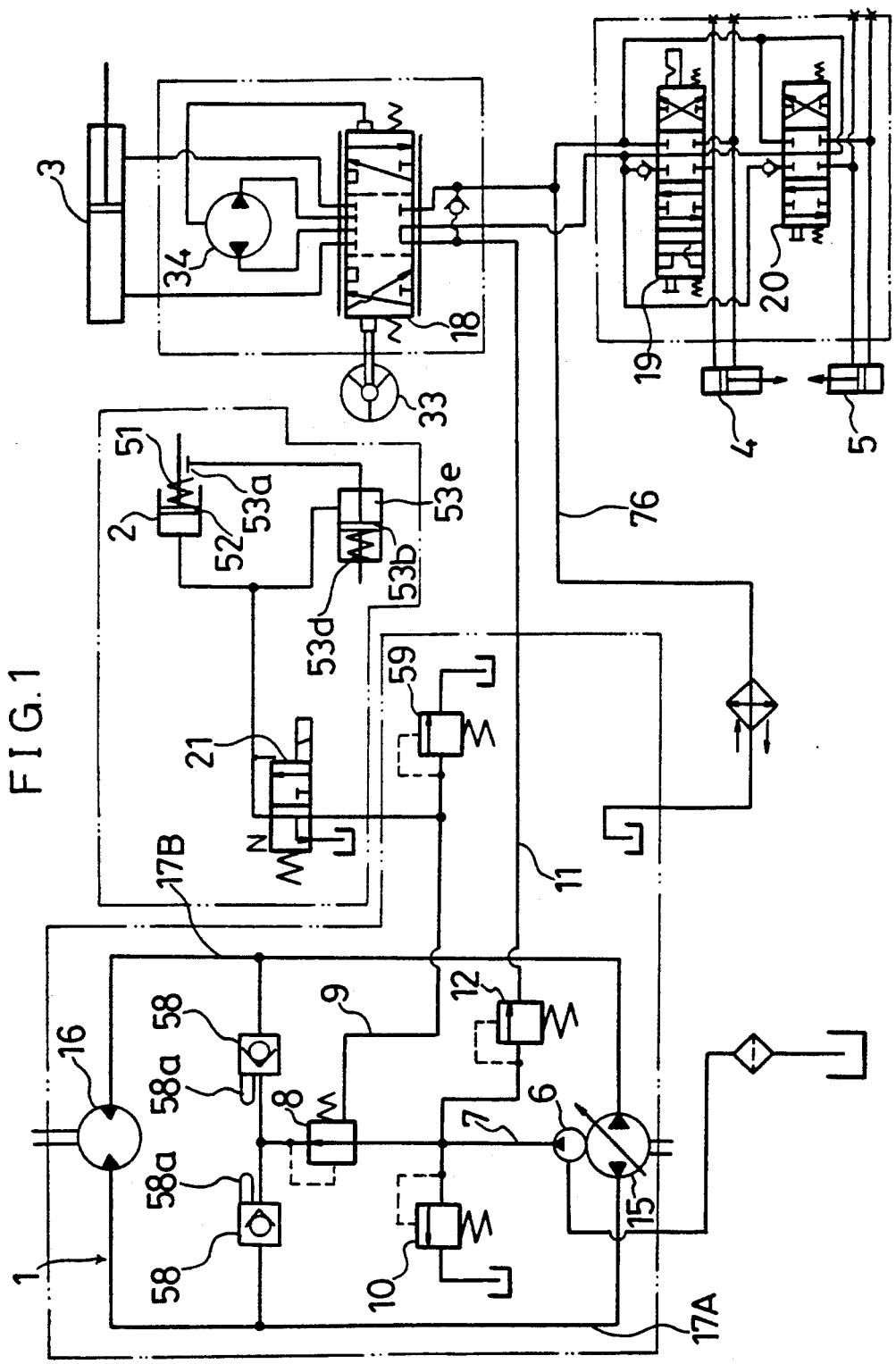
FIG. 1 is a fluid circuit diagram showing an embodiment of the fluid supply system according to the present invention.
Figure 3:
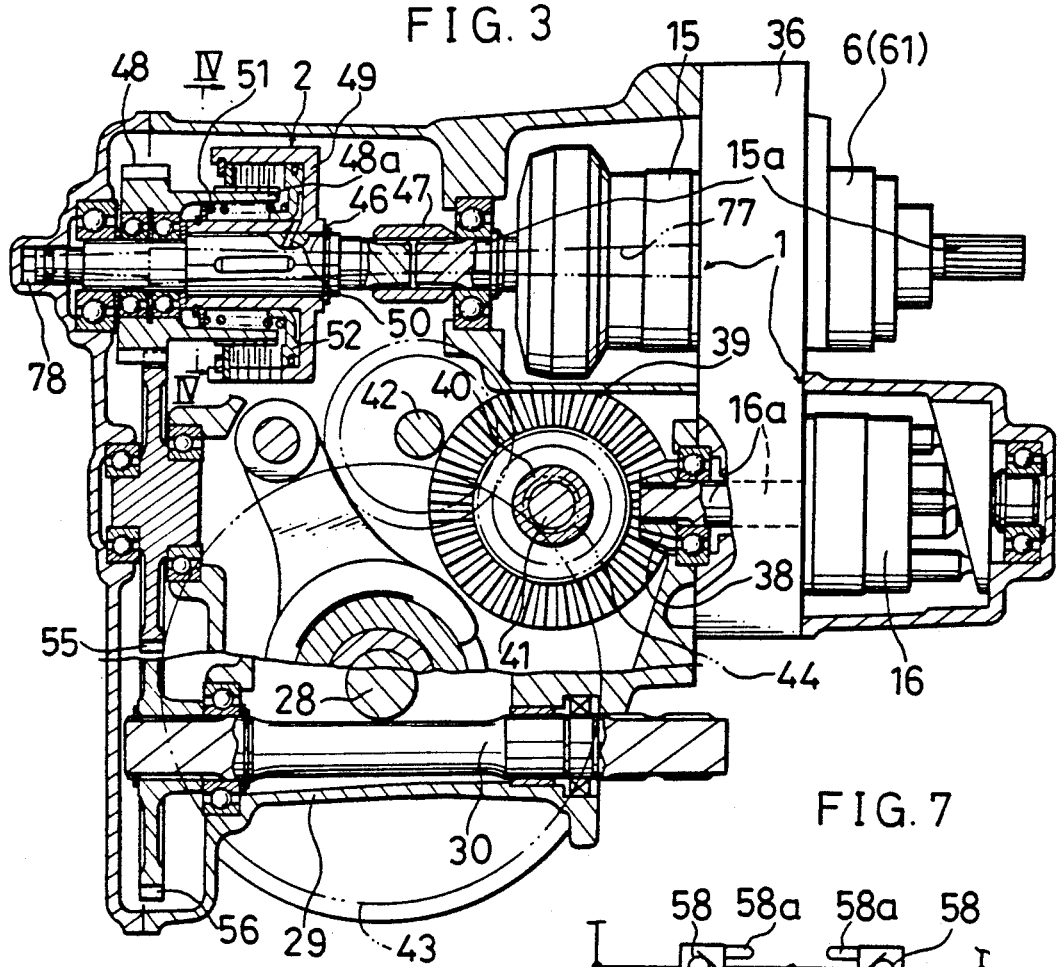
FIG. 3 is a sectional side view, partially developed, of a part of the tractor shown in FIG. 2.

The present invention relates to a fluid supply system adapted for use in a vehicle having, as depicted in FIGS. 1 and 3, a hydrostatic transmission 1 which is operable to vary travelling speed of the vehicle in a non-stepwise manner, a fluid-operated clutch 2 which is disposed in a power transmission path, and at least one hydraulic actuator 3, 4, 5 which is actuated by a high pressure fluid.

According to the present invention, the fluid supply system comprises a single hydraulic pump 6 for supplementing fluid to the hydrostatic transmission 1 and for supplying fluid respectively to the fluid-operated clutch 2 and to the hydraulic actuator 3, 4, 5. The hydraulic pump 6 flows out its discharge flow into a discharge path 7.

The fluid supply system also comprises a pressure-reducing valve 8 which is operable to reduce its inlet pressure to a predetermined outlet pressure with flowing out a part of its inlet flow into a fluid drain path 9. According to the present invention, the discharge path 7 is connected to the hydrostatic transmission 1 through the pressure-reducing valve 8 so as to supplement fluid of the outlet pressure to the hydrostatic transmission, whereas the fluid drain passage 9 is fashioned to a fluid supply path for supplying fluid to the fluid-operated clutch 2.

Figure 7:
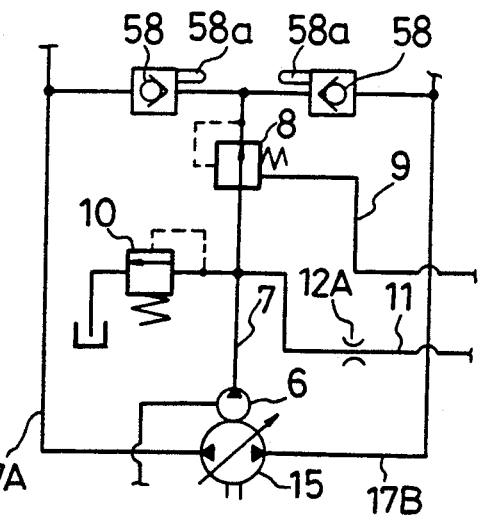
FIG. 7 is a fluid circuit diagram showing a part of a modification of the embodiment shown in FIG. 1.

The system according to the present invention further comprises a high pressure relief valve 10, which is connected to the discharge path 7, for establishing a high fluid pressure to be applied to the hydraulic actuator 3, 4, 5 and a second fluid supply path 11 which is connected to the discharge path 7 for supplying fluid from the discharge path tot he hydraulic actuator. A flow-restricting means is incorporated in the second fluid supply path 11 for maintaining fluid pressure in the discharge path 7 higher than the outlet pressure of the pressure-reducing valve 8. The flow-restricting means is preferably composed of a relief valve 12 (FIG. 1) or an orifice (FIG. 7).

The fluid supply system according to the present invention operates as follows:

In a condition where any hydraulic actuator 3, 4, 5 is not actuated so that fluid is drained from the second fluid supply path 11, fluid pressure in the discharge path 7 is determined by the relief valve 12 (FIG. 1) or orifice (FIG. 7) incorporated in the second fluid supply path 11. The pressure-reducing valve 8 operates to reduce such fluid pressure of the inlet side (for example, 12 kg/cm$^2$) to the predetermined outlet pressure (for example, 5 kg/cm$^2$) so that fluid of this outlet pressure is always supplemented to the hydrostatic transmission 1, namely to one passage of paired connecting fluid passages 17A, 17B, connecting between a hydraulic pump 15 and hydraulic motor 16 of the hydrostatic transmission, which passage is now lower in fluid pressure than the other passage.

In a condition where one or more hydraulic actuator(s) 3, 4, 5 is/are actuated by operating directional control valve(s) 18, 19, 20 therefor, fluid pressure in the discharge path 7 is determined by the high pressure relief valve 10 regardless of the relief valve 12 or orifice 12A, because the relief valve 12 or orifice 12A is incorporated in the fluid supply path 11 through which fluid is to be supplied to the hydraulic actuator(s). Consequently, fluid having a high pressure (for example, 80 kg/cm$^2$) established in the discharge path by the high pressure relief valve 10 is supplied from the discharge path 7 to one or more hydraulic actuator(s) 3, 4, 5 through the second fluid supply path 11. In this condition, too, the pressure-reducing valve 8 operates to reduce its inlet pressure to the predetermined outlet pressure of, for example, 5 kg/cm$^2$ so that fluid of this pressure is invariably supplemented to the hydrostatic transmission 1.

Flow rate of fluid drained from the pressure-reducing valve 8 is determined exclusively by fluid pressure applied to the outlet side of this valve. Consequently, fluid of a constant flow rate determined by fluid pressure of the outlet side of, for example, 5 kg/cm$^2$ is drained into the fluid drain path 9 in any of the conditions where a fluid pressure of, for example, 12 kg/cm$^2$ determined by the relief valve 12 or orifice 12A is established in the discharge path 7 or where a high fluid pressure of, for example, 80 kg/cm$^2$ determined by the high pressure relief valve 10 is established in the discharge path 7. The fluid-operated clutch 2 is engaged, when a directional control valve 21 for it is displaced to its operative position (I), by being supplied with fluid of such constant flow rate.

One of the advantages of the present invention consists in the fact that fluid is always supplemented to the hydrostatic transmission 1 from the discharge path 7 of the single hydraulic pump 6 so that there remains no fear of causing a damage of the hydrostatic transmission due to a lack of operating fluid in it. A further advantage consists in the fact that the single hydraulic pump 6 is satisfactory to have a discharge pressure which corresponds to the relief pressure of the high pressure relief valve 8, namely which is required exclusively by the hydraulic actuator or actuators 3, 4, 5, so that cost for the system is reduced.

Furthermore, because fluid drained from the pressure-reducing valve 8 at a constant rate, which is less than the discharge rate of the pump 6 by the sum of flow rate supplemented to the hydrostatic transmission 1 and flow rate flowing into the second fluid supply path 11, is used for fluid for operating the fluid-operated clutch 2 in a power transmission path, a directional control valve (21) for the clutch 2 is satisfactory to control fluid flow of a relatively small, constant flow rate so that the control valve may be reduced in size.

DESCRIPTION OF A PREFERRED EMBODIMENT

Figure 2:
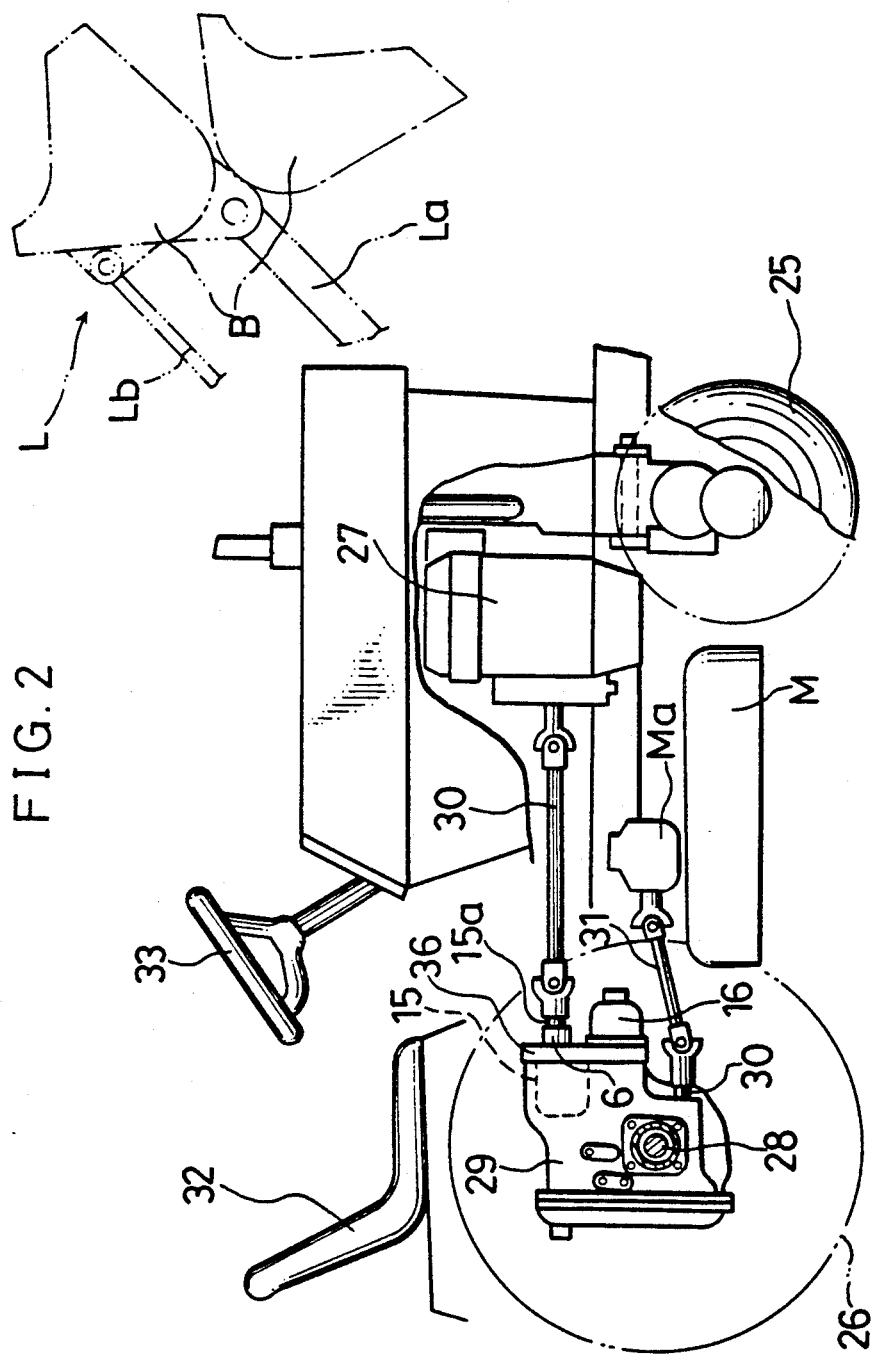
FIG. 2 is a schematic side view, partially cut away and partially in section, of a mower tractor in which the fluid supply system shown in FIG. 1 is employed.

The embodiment shown is employed in a mower tractor which is adapted to be equipped, as shown in FIG. 2, with a front loader L at a front of the vehicle as well as with a mower M at an underside of the vehicle and between paired front wheels 25 and rear wheels 26.

As shown in FIG. 2, an engine 27 is mounted on a front portion of the vehicle. Between the left and right rear wheels 26, a transmission casing 29 is disposed which supports left and right rear wheel axles 28. Power of the engine 27 is transmitted into the transmission casing 29 through a transmission shaft 30 extending axially of the vehicle, and the left and right rear wheels 26 are driven to rotate so as to travel the vehicle. A mid-PTO shaft 30 extends forwardly at a low level from the transmission casing 29 and is adapted to transmit mower-driving power into a gear box Ma of the mower M through a transmission shaft 31.

A seat 32 is disposed above the transmission casing 29 and a steering wheel 33 is located before the seat 32. As shown in FIG. 1, the steering wheel 33 is adapted to displace a directional control valve 18 for a power cylinder 3, which is one of the high pressure-actuated hydraulic actuators employed in the vehicle, so as to turn the left and right front wheels 25 selectively for a vehicle-steering purpose. In FIG. 1, numeral 34 designates a metering motor provided in the power steering mechanism.

As shown in FIG. 2, the front loader L comprises a bucket B which is supported for tilting movement by a pair of lift arms La. The bucket B which is lifted and lowered by upward and downward rotational movements of the lift arms La is tilted through a link Lb. As shown in FIG. 1, a lift cylinder 4 is provided for lifting and lowering the bucket B through the lift arms La and a tilt cylinder 5 is provided for tilting the bucket B through the link Lb. These cylinders 4 and 5 are two of the high pressure-actuated hydraulic actuators which are employed in the vehicle shown.

Figure 5:
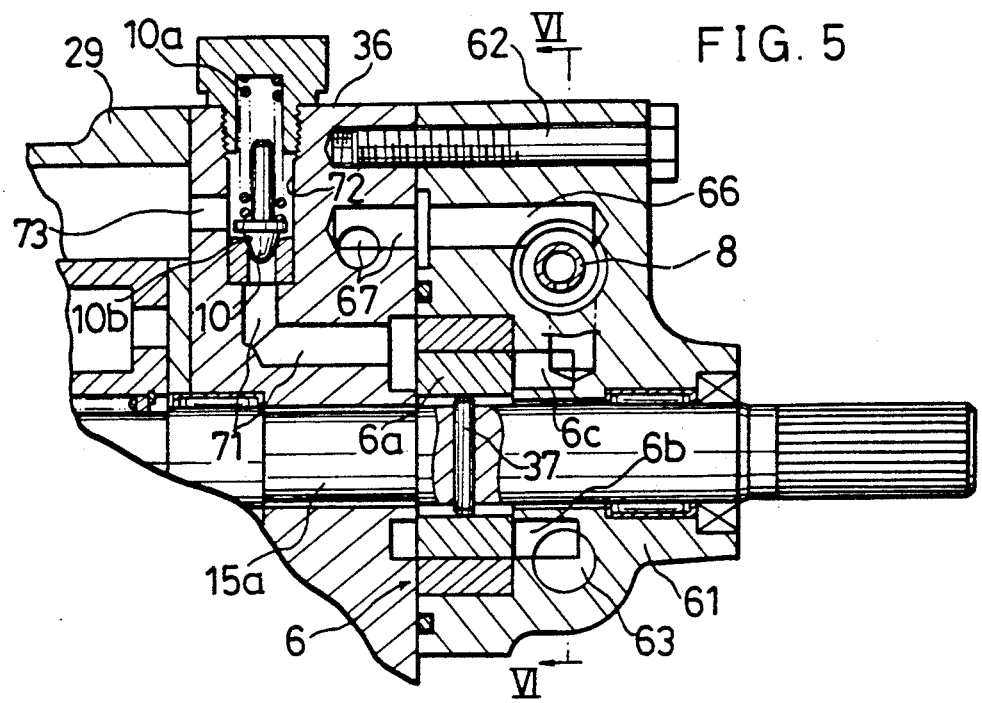
FIG. 5 is a sectional side view of a part of the embodiment.

As shown in FIG. 3, a plate member 36 having a relatively large thickness is secured to a front of the transmission casing 29. The hydrostatic transmission 1 comprises a hydraulic pump 15, which is mounted on a rear surface of the plate member 36 and is located at an upper portion within the transmission casing 29, and a hydraulic motor 16 which is mounted on a front surface of the plate member 36 at a level lower than the pump 15. As will be detailed later, fluid passages and valves associated to the hydrostatic transmission 1 are disposed in the plate member 36. Pump shaft 15a of the hydraulic pump 15 extends forwardly of the plate member 36 and is connected to the transmission shaft 30 shown in FIG. 2. The single hydraulic pump 6 set forth before is mounted on a front of the plate member 36 and is fashioned, as shown in FIG. 5, to a trochoid pump having a rotor member 6a which is co-rotatably engaged to the pump shaft 15a of the hydrostatic transmission using a pin 37 which extends radially though the shaft 15a.

As shown in FIG. 3, motor shaft 16a of the hydraulic motor 16 extends rearwardly through the plate member 36 into the transmission casing 29 and carries at its rear end a bevel gear 38. At a level below the hydraulic pump 15 within the transmission casing 29, a hollow shaft 40 is rotatably mounted on a transmission shaft 41, extending laterally of the transmission casing, and has on it a bevel gear 39 which meshes with the bevel gear 38. A reduction shaft 42 extending laterally of the transmission casing is disposed rearwards and upwards of the co-axial shafts 40 and 41. At a lower portion within the transmission casing, a differential gearing (not shown) is disposed which has as its input gear a spur gear 43 of a large diameter and which is composed by employing left and right rear wheel axles 28 as its output shafts. A spur gear 44 of a small diameter which is integral with the transmission shaft 41 meshes with the spur gear 43. Although not shown in the drawings, transmission mechanism disposed within the transmission casing 29 for transmitting vehicle-driving power includes a reduction gearing, which is adapted to transmit rotation from the hollow shaft 40 to the transmission shaft 41 via the reduction shaft 42 with a reduced speed of rotation and which has a final reduction gear mounted rotatably on the transmission shaft, and a shiftable clutch which is mounted on the transmission shaft 41 and is operable selectively to connect the hollow shaft 40 directly to the transmission shaft or to connect the final reduction gear, set forth above, to the transmission shaft and to thereby connect the hollow shaft 40 to the transmission shaft through the reduction gearing set forth above.

As also shown in FIG. 3, the pump shaft 15a extends rearwardly from the hydraulic pump 15 and is coupled to a co-axial drive shaft 46 using a coupling sleeve 47. A gear 48 is rotatably mounted on a rear end portion of the drive shaft 46 for transmitting power to the mid-PTO shaft 30. The fluid-operated clutch 2 set forth before is disposed in a transmission path for transmitting mower-driving power and operable to connect the gear 48 to the drive shaft 46.

Figure 4:
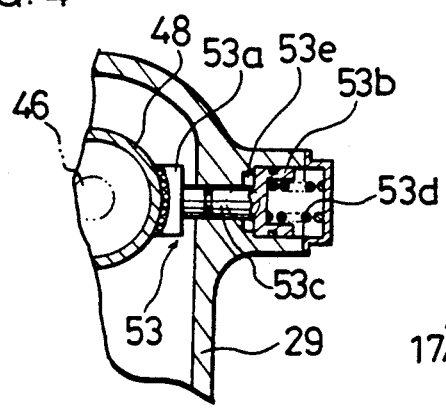
FIG. 4 is a fragmentary sectional view taken generally along line IV—IV of FIG. 3.

This clutch 2 comprises opposite sets of frictional elements which are slidably but non-rotatably supported respectively by a clutch housing 49, fixedly mounted on the drive shaft 46, and by a boss portion 48a of the gear 48. The fluid-operated clutch further comprises a piston 52 which is disposed within the clutch housing 49 and is biased to move away from the frictional elements by a return spring 51. The clutch 2 is engaged by fluid under pressure, supplied through a fluid passage 50 in the drive shaft 46, which causes the piston 52 to move toward the frictional elements against the biasing force of return spring 51 and to thereby cause a frictional engagement between the opposite sets of frictional elements. As shown in FIG. 4, a brake 53 is disposed at a rear and uppermost portion within the transmission casing 29 and comprises a brake shoe 53a which is opposed to the boss portion of the gear 48. The brake shoe 53a is attached to a piston rod 53c of a piston 53b which is disposed within a side wall of the transmission casing 29. The piston 53b is biased by a spring 53d to move toward a direction such that the brake shoe 53a is pressingly engaged to the boss portion of gear 48. A fluid chamber 53e is provided within the side wall of transmission casing for applying fluid pressure to the piston 53b so as to move the piston against the biasing force of spring 53d and so as to thereby move the brake shoe 53a away from the boss portion of gear 48. The brake 53 is operable to brake the gear 48, when the fluid-operated clutch 2 is disengaged, so as to thereby stop an inertial rotation of the driven side of clutch 2 quickly, as will be detailed later.

As shown in FIG. 3, the mid-PTO shaft 30 extends forwardly from a rear end portion within the transmission casing 29 and projects forwardly from the transmission casing at a level below the plate member 36. The gear 48 on the drive shaft 46 is adapted to drive a gear 56, fixedly mounted on a rear end portion of the mid-PTO shaft 30, so as to rotate the shaft 30 through an intermediate gear 55.

Referring to the fluid supply system shown, the pressure-reducing valve 8 is connected at its outlet side, as shown in FIG. 1, to a pair of connecting fluid passages 17A and 17B between the hydraulic pump 15 and motor 16 through a pair of check valves 58. Each of the check valves 58 includes an operating rod 58a by which each check valve may be opened so as to permit a free flow of fluid when required. The check valves are opened using the operating rod 58a, for example, when the vehicle is to be dragged by another vehicle.

The fluid drain path 9 includes in it a relief valve 59 for establishing a fluid pressure of, for example, 12 kg/cm$^2$ to be applied to the fluid-operated clutch 2. The drain path 9 is connected at an upstream side of this relief valve 59 to the clutch 2 through a directional control valve 21. The control valve 21 has a neutral position N, where fluid is drained from the clutch 2, and an operative position I where fluid having a pressure determined by the relief valve 59 is supplied to the clutch 2. Clutch port of the directional control valve 21 is also connected to the fluid chamber 53e of the brake 53. Consequently, the brake 53 is released when the control valve 21 is in its operative position I where the clutch 2 is engaged. When the control valve 21 is returned to its neutral position N so as to disengage the fluid-operated clutch 2, fluid is drained from the fluid chamber 53e so that the brake 53 is operated by the force of spring 53d so as to stop an inertial rotation of the driven side of clutch 2 quickly.

As also shown in FIG. 1, the fluid supply path 11 for supplying fluid from the pump discharge path 7 to high pressure-actuated hydraulic actuators is connected to respective fluid inlet ports of directional control valves 18, 19 and 20 for the power cylinder 3, lift cylinder 4 and tilt cylinder 5.

Figure 6:
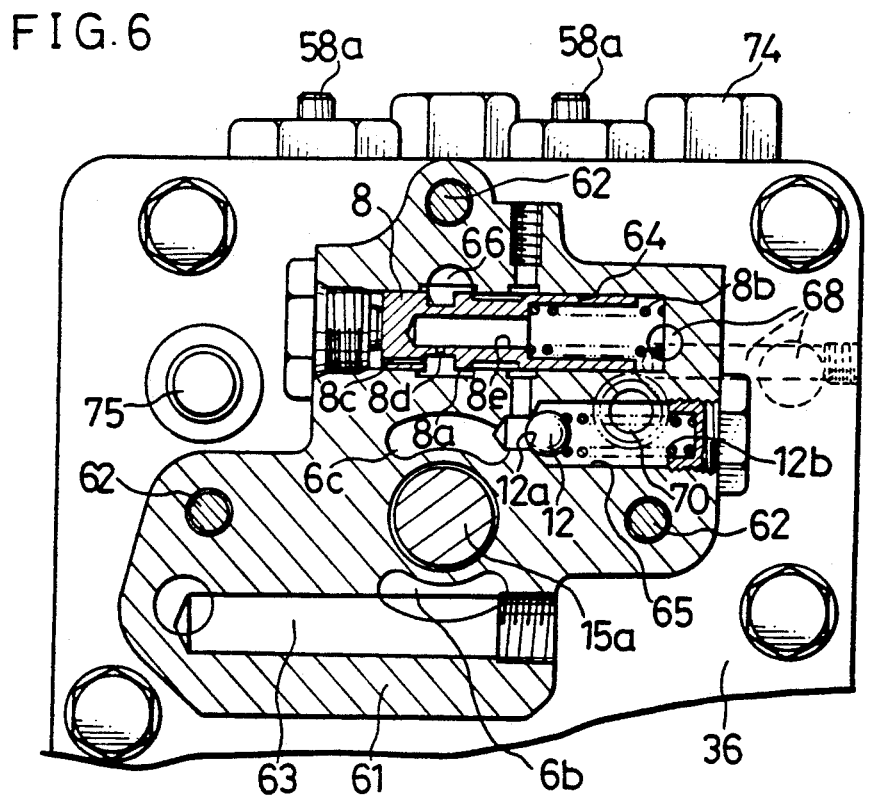
FIG. 6 is a sectional view taken generally along line VI—VI of FIG. 5.

As shown in FIGS. 5 and 6, a pump housing 61 is secured to a front of the plate member 36 using bolts 62 and the pressure-reducing valve 8 and relief valve 12 are disposed within the pump housing 61. The high pressure relief valve 11 is disposed within the plate member 36.

As also shown in FIGS. 5 and 6, the pump housing includes a suction fluid passage 63 which communicates with a fluid sump within the transmission casing 29 through a fluid passage (not shown) in the plate member 36. This suction fluid passage 63 is communicated to a suction port 6b of the hydraulic pump 6. The pump housing 61 further includes upper and lower valve-receiving bores 64 and 65 each of which extends laterally of the housing 61 and is communicated to a discharge port 6c of the pump 6. Of these bores, the upper bore 64 includes in it the pressure-reducing valve 8, whereas the lower bore 65 includes in it the relief valve 12.

The pair of check valves 58 set forth before by referring to FIG. 1 are disposed within the plate member 36 (only the operating rods 58a of these check valves are shown in FIG. 6). Fluid passages 66 and 67 for communicating the valve-receiving bore 64 to the inlet sides of check valves 58 ar formed respectively in the pump housing 61 and in the plate member 36, as shown in FIGS. 5 and 6. The pressure-reducing valve 8 comprises a land 8a for restricting flow area between the bore 64 and passage 66 and is biased by a valve spring 8b to move toward a direction of enlarging the flow area. The valve 8 includes in it a fluid passage 8c through which fluid pressure in the fluid passage 66 is applied to this valve 8 from the direction opposite to the biasing direction by means of valve spring 8b. For draining fluid from the outlet side of the pressure-reducing valve 8, this valve further includes in it a small radial bore 8d and a central passage 8e. Space within the valve-receiving bore 64 at which space the central passage 8e opens is communicated through a fluid passage 68 to the relief valve 59 shown in FIG. 1 which is disposed within the plate member 36 although not shown in FIGS. 5 and 6.

The relief valve 12 is composed of a ball which is seated on a valve seat 12a, formed on an inner circumference of the valve-receiving bore 65 at an inner end portion of the bore, by the biasing force of a valve spring 12b. A fluid passage 70 is formed in the pump housing 61 for communicating the outlet or secondary side of the relief valve 12 to an actuator port (not shown) which is formed in the plate member 36 for supplying fluid to the hydraulic actuators 2, 3 and 4 through conduit means.

A fluid passage 71 communicating with the discharge port 6c of the pump 6 is formed in the plate member 36 and opens at a vertical valve-receiving bore 72 formed in the plate member 36. The high pressure relief valve 10 is composed of a poppet which is disposed in the bore 72 and is biased to move by a valve spring 10a so as to seat on a valve seat 10b. The bore 72 is communicated at the secondary side of the high pressure relief valve 10 into the transmission casing 29 through a fluid passage 73.

In FIG. 6, numeral 74 designates a threaded plug which closes an end of a vertical valve-receiving bore (not shown) formed in the plate member 36 for providing the relief valve 59 (FIG. 1) for the fluid-operated clutch 2 within the plate member. The plate member 36 further includes a conduit-connecting port 75, shown in FIG. 6, for connecting a conduit 76 shown in FIG. 1 through which fluid is drained from the hydraulic autuators 3, 4 and 5. This port 75 is communicated into the transmission casing 29 for returning fluid from the conduit 76 into the fluid sump within the transmission casing. As shown in FIG. 6, the operating rods 58a of the check valves 58 shown in FIG. 1 extend upwardly of the plate member 36.

The directional control valve 21, shown in FIG. 1, for the fluid-operated clutch 2 is also disposed within the plate member 36, although not shown. A fluid passage 77 shown in phantom in FIG. 3 is formed in a side wall of the transmission casing 29 for connecting the control valve 21 to the clutch 2. This passage 77 is communicated to a fluid chamber 78, formed in a rear end cover of the transmission casing and located behind the drive shaft 46, and, then, to the clutch 2 through the fluid passage 50 in the drive shaft 46. The passage 77 is also communicated to the fluid chamber 53e shown in FIG. 4.

FIG. 7 shows a modification in which the relief valve 12 shown in FIG. 1 is replaced by an orifice 12A. The other parts of this modification are same as the corresponding parts of the system shown in FIG. 1.

We claim:

1. In a vehicle having a hydrostatic transmission which is operable to vary travelling speed of the vehicle in a non-stepwise manner, a fluid-operated clutch which is disposed in a power transmission path, and at least one hydraulic actuator which is actuated by high pressure fluid, a fluid supply system comprising:

a single hydraulic pump (6) for supplementing fluid to said hydrostatic transmission (1) and for supplying fluid respectively to said fluid-operated clutch (2) and to said hydraulic actuator (3, 4, 5), said hydraulic pump flowing out its discharge flow into a discharge path (7);

a pressure-reducing valve (8) operable to reduce its inlet pressure to a predetermined outlet pressure with flowing out a part of its inlet flow into a fluid drain path (9), said discharge path (7) being connected to said hydrostatic transmission (1) through said pressure-reducing valve so as to supplement fluid of said outlet pressure to said hydrostatic transmission, said fluid drain path being fashioned to a fluid supply path for supplying fluid to said fluid-operated clutch (2);

a high pressure relief valve (10) for establishing a high fluid pressure to be applied to said hydraulic actuator (3, 4, 5), said relief valve being connected to said discharge path (7);

a second fluid supply path (11) connected to said discharge path (7) for supplying fluid from said discharge path to said hydraulic actuator (3, 4, 5); and a flow-restricting means (12, 12A) incorporated in said second fluid supply path (11) for maintaining fluid pressure in said discharge path (7) higher than said outlet pressure of said pressure-reducing valve (8) but substantially lower than said high fluid pressure determined by said high pressure relief valve (10).

2. A fluid supply system as set forth in claim 1, wherein said flow-restricting means comprises a relief valve (12).

3. A fluid supply system as set forth in claim 1, wherein said flow-restricting means comprises an orifice (12A).

* * * * *